March 13, 1956 J. W. HEATH ET AL 2,738,425
FLUX CONTROL MEANS
Filed Nov. 16, 1954 3 Sheets-Sheet 1
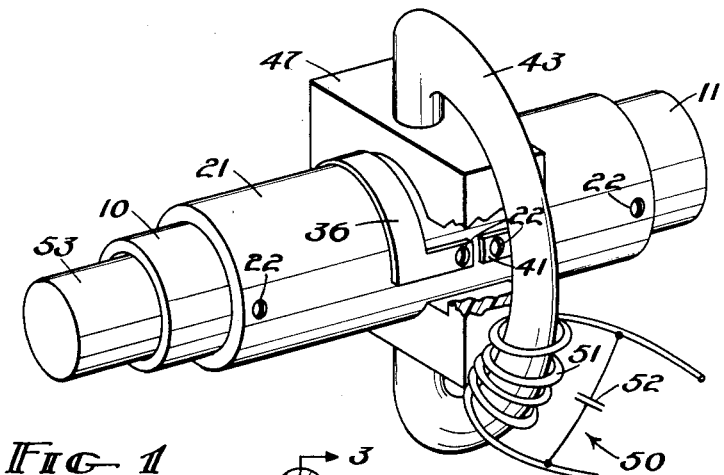
FIG-1
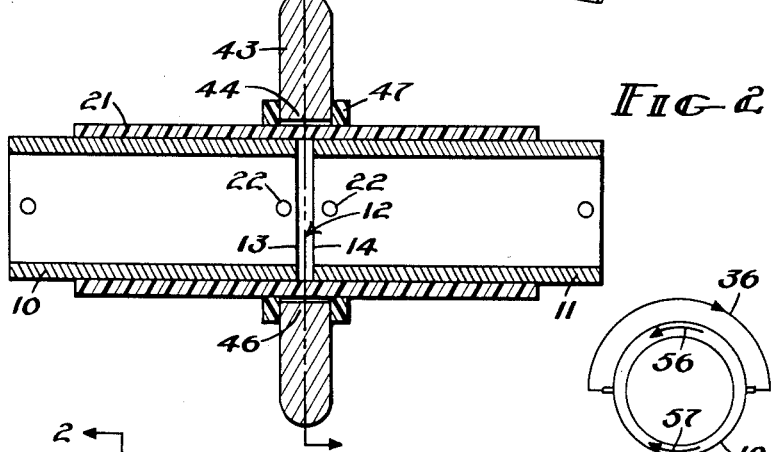
FIG-2
FIG-4
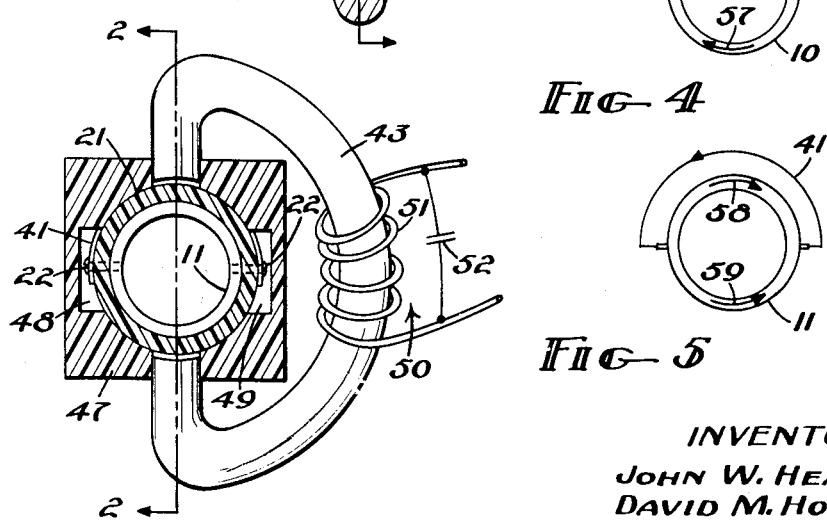
FIG-3
FIG-5
INVENTORS
JOHN W. HEATH
DAVID M. HODGIN JR
LEO R SPOGEN JR
HARRIS A. STOVER
BY Marvin Moody
ATTORNEY

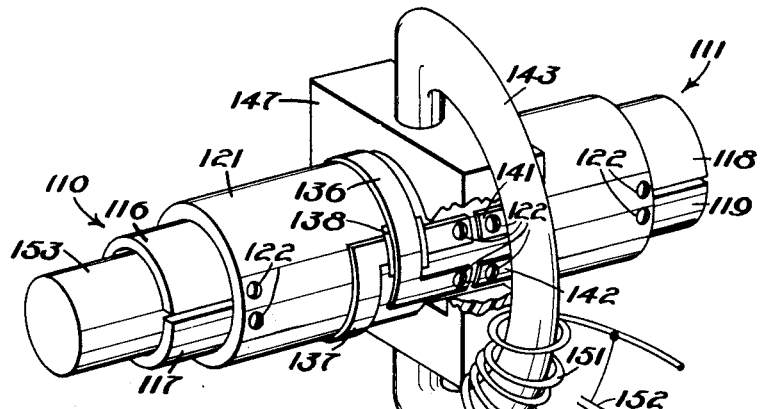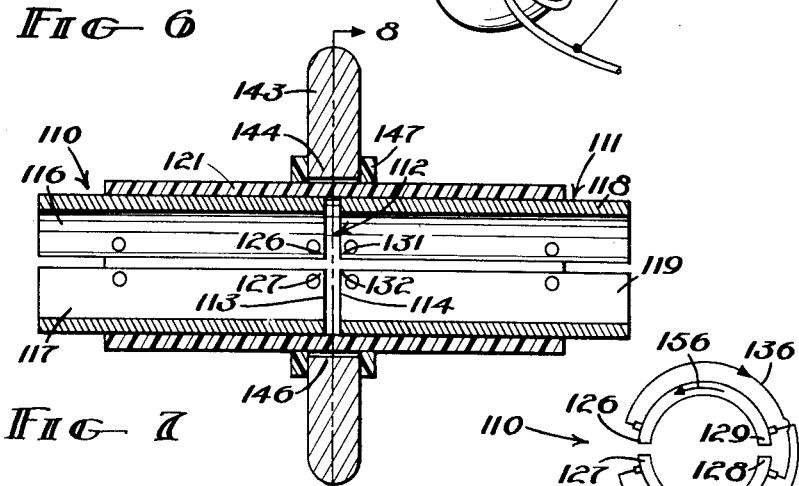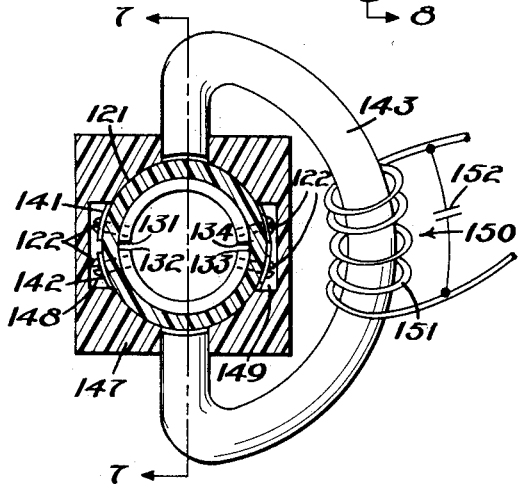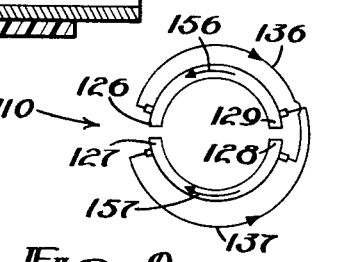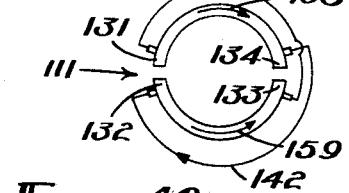

March 13, 1956   J. W. HEATH ET AL   2,738,425
FLUX CONTROL MEANS
Filed Nov. 16, 1954   3 Sheets-Sheet 3
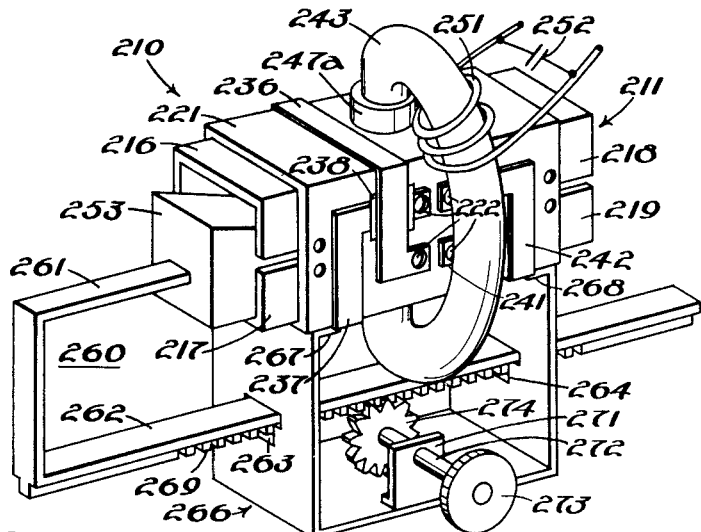
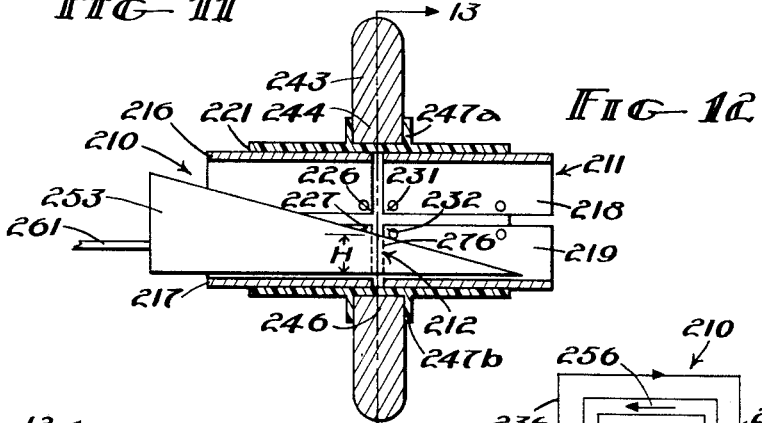
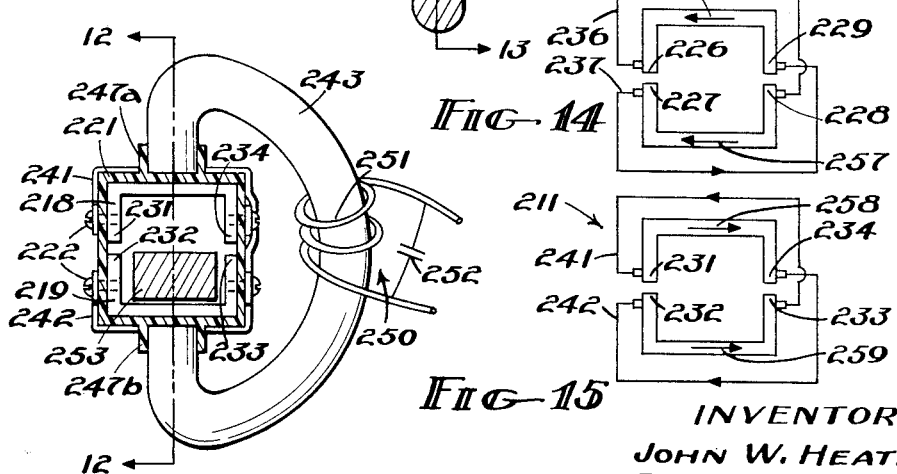
INVENTORS
JOHN W. HEATH
DAVID M. HODGIN, JR
LEO R. SPOGEN, JR
HARRIS A. STOVER
By Marvin Moody
ATTORNEY United States Patent Office 2,738,425
Patented Mar. 13, 1956

2,738,425

FLUX CONTROL MEANS

John W. Heath, David M. Hodgin, Jr., Leo R. Spogen, Jr., and Harris A. Stover, Cedar Rapids, Iowa, assignors to Collins Radio Company, Cedar Rapids, Iowa, a corporation of Ohio Application November 16, 1954, Serial No. 469,122

11 Claims. (Cl. 250—40)

This invention relates generally to flux control means and particularly to means for confining flux within predetermined boundaries.

The invention may be utilized where there is a field of changing electromagnetic flux and is concerned primarily with means for confining the flux within accessible boundaries where it may be advantageously worked on to accomplish functions otherwise difficult or impossible. The flux boundaries provided by the invention are generally parallel planes but also may be surfaces which have lines parallel only in the direction of the flux.

This invention may use the flux provided by the magnetic circuit of a coil, connected to a source of alternating voltage, and will concentrate the flux of the magnetic circuit within the confines of a narrow cross-sectional area, where maximum control over the flux may be obtained. Where the coil has a paramagnetic core, strong fields of flux may be obtained across an air gap in the core, which may be made of powdered iron or ferrite, for example; and the invention can control all the flux in the magnetic circuit with ease and without the difficulties caused by stray flux.

A narrow beam of flux may be used for many specialized purposes. For example, the inductance of a coil may be controlled precisely by controlling its flux that is confined by this invention in a readily accessible place. The embodiments of the invention explained herein show it included in means for precisely testing a tuning core for uniformity of permeability, and in a means for obtaining a resonant circuit with an easily controllable relationship between tuning frequency and tuning knob position.

It is, therefore, an object of this invention to provide means for concentrating all of the alternating flux of a magnetic circuit within narrow boundaries that are easily accessible.

It is another object of this invention to prevent flux from fringing outside of predetermined boundaries.

It is still another object of this invention to provide a flux field that has only substantially parallel lines of flux.

It is yet another object of this invention to provide a narrow sheet of flux utilizable for the precise testing of paramagnetic materials and/or conducting materials.

It is a still further object of this invention to provide means for controlling the flux that is confined within a narrow cross-section.

It is a yet further object of this invention to provide a narrow sheet of flux utilizable in a resonant circuit for providing an easily controllable relationship between the tuned frequency and the mechanical position of a tuning core.

The invention includes two cylindrical members of any cross-section which are positioned end to end with a gap therebetween that is aligned with an alternating flux field. The gap extends along a hypothetical plane, which is used herein for purposes of description and definition. The flux field may be provided across the air-gap between the ends of an arcuate core of paramagnetic material which has a coil wound about it. The coil is connected in an alternating current circuit which may be a resonant circuit.

While the members are shown and described as cylindrical because that form is the most convenient for the described embodiments, the invention is also operative in some forms if the members are conical.

Although two flux boundaries are ordinarily required, in which case the two cylindrical members are used, the invention can also provide a single flux boundary by using only a single cylindrical member.

Generally, when a cylindrical member is held in a transverse position in a flux field, electromotive forces are induced in it. These voltages have opposing polarities on opposite sides of the cylindrical member. The opposing voltages cancel each other and hence do not cause any substantial eddy current flow.

In general, the invention provides electrical conductors which connect at their ends to selected points on the cylindrical members in a manner that utilizes the electromotive forces induced by a varying flux. The conductors form special circuitry wherein particular eddy currents are caused by the induced voltages to control the flux field.

One form of the invention having two cylindrical members uses two conductors. Each conductor connects at its ends to one of the cylindrical members at diametrically opposite points, which are adjacent to the flux gap and which lie in a plane transverse to the direction of the required flux field. This manner of connection places the otherwise opposing induced voltages in each cylindrical member in parallel with each other through the added conductor. Then, eddy currents flow freely in opposing directions through the opposite semi-cylindrical portions of each cylindrical member to make it a flux barrier.

Another form of the invention requires each of the two cylindrical members to be cut into two pieces along a plane that is generally transverse to the flux. This second hypothetical plane, called the transverse plane, is generally transverse to the flux plane and is used herein for purposes of description and definition and extends generally longitudinal of the cylindrical members. Thus, the two cylindrical members are divided into a total of four semi-cylindrical pieces, each piece having a different polarity of voltages induced in it.

The four pieces, comprising the two cylindrical members in this form of the invention are, for convenience, shown of equal size but need not be equal for operability of the invention. The pieces are made of conducting material such as copper and are insulated from each other along the flux plane and the transverse plane except as hereafter described.

The portions of the four pieces that are adjacent to the intersection of the perpendicular hypothetical planes are designated herein as corners. Hence, each cylindrical member has four corners which consist of two pairs of corners that are located diagonally with respect to each other.

The two cylindrical members are separated along the flux plane by an amount that determines the cross-sectional width of the flux field at that portion of the flux circuit. The adjacent ends of the two cylindrical members should be terminated in planes substantially parallel to the direction of the flux. However, the angle of the transverse plane with respect to the flux plane is not critical.

The second form of the invention requires that each pair of diagonal corners be conductively connected. The diagonal connections provide a series circuit that changes the otherwise opposing polarities of the voltages induced in the pieces to the same polarity to maintain eddy currents that provide the boundary conditions for the flux.

Hence, the invention teaches how the members must be made and connected so that the voltages induced in them may be utilized.

Further objects, advantages, and features of this invention will become apparent to a person skilled in the art upon further study of this specification and drawings, in which:

Figure 1 is a perspective view of one form of this invention utilized as a means for testing permeable cores;

Figure 2 is a sectional view taken along line 2—2 in Figure 3;

Figure 3 is a sectional view taken along line 3—3 in Figure 2;

Figure 4 is a schematic view which shows the induced voltage relationship in one cylindrical member of the form of the invention shown in Figure 1.

Figure 5 is a schematic view that shows the induced voltage relationship in the other cylindrical member of the form of the invention shown in Figure 1.

Figure 6 is a perspective view of another form of the invention utilized as a means for testing permeable cores;

Figure 7 is a sectional view taken along line 7—7 in Figure 8;

Figure 8 is a sectional view taken along line 8—8 in Figure 7;

Figure 9 is a schematic view which shows the induced voltage relationship in one cylindrical member of the form of this invention shown in Figure 6.

Figure 10 is a schematic view that shows the induced voltage relationship in the other cylindrical member of the form of the invention shown in Figure 6.

Figure 11 is a perspective view of another form of this invention utilized as a tuning means;

Figure 12 is a cross-sectional view taken along line 12—12 in Figure 13;

Figure 13 is a sectional view taken along line 13—13 in Figure 12;

Figure 14 is a schematic diagram which represents the induced voltage relationship in one cylindrical member of the form of the invention shown in Figure 11; and Figure 15 is a schematic diagram which represents the induced voltage relationship in the other cylindrical member of the form of the invention shown in Figure 11.

Now referring to the invention in more detail, Figures 1, 2, and 3 show it utilized as an apparatus for testing magnetic cores, which might be used in radio equipment. The apparatus has first and second cylindrical members 10 and 11 of circular cross-section that are axially aligned and separated by a narrow gap 12 at their adjacent parallel ends 13 nd 14.

A cylindrical support 21 of plastic material surrounds both cylindrical conducting members 10 and 11 and supports them by screws 22, or by rivets, cement, or other suitable fastening means. Member 10 has adjacent to gap 12 two diametrically opposite conducting screws 22 that lie in a plane transverse to gap 12. Similarly, the other cylindrical member 11 has adjacent to gap 12 two diagonally opposite conducting screws 22 that lie in the same transverse plane.

A conducting band 36 which may be made of copper is connected at its ends to diametrically opposite screws 22 that are adjacent to gap 12 in member 10; while another conducting band 41, which is similarly located externally to support 21, is connected at its ends to diametrically opposite screws 22 in member 11.

A yoke 43, which is an arcuate core of highly permeable material, such as ferrite, has its ends 44 and 46 received at diametrically opposite sides of plastic cylinder 21, and the ends 44 and 46 are centered with respect to gap 12, as shown in Figure 2. A yoke bracket 47 which may be made of plastic material supports yoke 43 to plastic cylinder 21 in the above-described position. Yoke bracket 47 has a pair of notches 48 and 49 on opposite sides to enable it to be received over screw members 22.

A coil 51 is wound on core 43 to provide an alternating magnetomotive force through the magnetic circuit of yoke 43 which includes gap 12 between yoke ends 44 and 46. A condenser 52 is connected in parallel with coil 51, and together they form a parallel resonant circuit 50 which may determine the frequency of an oscillator (not shown).

A paramagnetic core 53, which is a workpiece to be tested, is received within cylindrical conducting members 10 and 11 in Figure 1.

In the operation of the apparatus in Figure 1, a magnetic path is provided through yoke 43 and across gap 12 between yoke ends 44 and 46 which is primarily air space when core 53 is removed. Since the length of gap 12 is relatively large and the material of yoke 43 has very high permeability which, for example, might be in the order of 1000, primarily all of the reluctance of the magnetic path is provided across the space between the yoke ends 44 and 46.

The lines of flux which pass centrally between the yoke ends will be substantially parallel to each other, while the lines of flux on either side will bow outwardly in a fringing manner. The center and substantially parallel lines of flux will pass within gap 12 between the adjacent ends of the cylindrical members 10 and 11. However, the fringing flux will intersect the conducting material of the pieces and, since the flux is alternating, will induce voltages in the conducting pieces that it intersects. Figure 4 shows schematically the eddy current path in member 10, and the arrows 56 and 57 indicate the direction of the voltages induced at one instant. Similarly, Figure 5 shows schematically the eddy current path in member 11, and the arrows 58 and 59 indicate the direction of the voltages induced in member 11 at the same instant.

If, for the moment, it is assumed that cylindrical members 10 and 11 do not have conducting bands 36 and 41, it will be noted that the induced voltages shown in Figures 4 and 5 would oppose each other and cancel so that no eddy currents could flow in the sense of the invention to provide a boundary condition. Hence, such cylindrical tubes will have little effect on the fringing flux.

However, in the invention, each member is connected conductively at diametrically opposite points adjacent to gap 12, as is seen in Figures 4 and 5. This set of connections takes the ordinarily opposing induced voltages and changes them into cooperating voltages which propagate current through the members and adjoining bands along the paths shown in Figures 4 and 5 where each provides a set of flux boundary conditions.

Since the members and conducting strips have very low resistance, the current will be high and will provide a large flux which counteracts only the fringing flux that intersects the members; but the parallel flux within gap 12 is not materially affected. Hence, the only flux which exists in the invention to any substantial extent is the flux within the narrow gap 12. The term "narrow" herein means narrow compared to the longitudinal width of the yoke ends.

It will be remembered that inductance is defined as follows:

$$L = K \frac{\phi}{I}$$

Where L is the inductance of coil 51, K is a proportionality constant, $\phi$ is the number of flux lines in the magnetic circuit of the coil, and I is the current through the coil which induces the flux. Hence, it is noted from the above formula that inductance is directly proportional to the amount of flux.

Any disturbance of the lines of flux which pass through gap 12 necessarily changes the inductance of coil 51. For example, a slight change in the permeability of the medium within gap 12 will alter the reluctance of the gap and the magnetic circuit to change the inductance of the coil. When the inductance of coil 12 changes, it will of course change the frequency of an oscillator connected to it. Thus, change in the frequency of an oscillator, controlled by tank circuit 50, will detect variations in a permeable medium presented within gap 12.

If core 53, which is the workpiece to be tested, is moved through cylindrical members 10 and 11, it will be intersected at any instant only by the narrow sheet of flux within narrow gap 12. Hence, it is only the permeability of that narrow cross-section of core that can affect the magnetic circuit of coil 51. If the core has uniform permeability throughout, each incremental cross-section presented to the flux will provide exactly the same reluctance. Accordingly, the total reluctance of the magnetic circuit will not change as the core is drawn through gap 12. The number of lines of flux will remain constant to provide a constant output frequency for the oscillator, which may be indicated on a frequency meter or on a graph by a scribing device. A core of uniform permeability will hence be indicated by a non-changing frequency output. If there should be an imperfection within core 53, such as a void, there will be a discontinuity of reluctance when the imperfection is presented within gap 12; and at that point there will be a change in the output frequency to indicate the imperfection. Generally, the testing apparatus is most sensitive when gap 12 is narrow.

The device of Figure 1 can also be used to test non-permeable metallic members for internal imperfections such as voids or cracks. For example, core 53 might instead be an aluminum or copper rod which presents a conducting medium within gap 12, wherein eddy currents are induced to counteract the flux in the gap. If the rod is uniform throughout, the eddy currents in the gap will remain uniform as the rod is moved through it; and, consequently, the inductance of coil 43 and its frequency output will remain constant. Should an internal void or crack appear in the material that is presented within gap 12, the eddy current paths therein will be disturbed to change the output frequency of the oscillator during the period that the imperfection exists within the gap. Due to the narrowness of the gap, the portion of a core or rod of conducting material or wire which has the imperfection may be very accurately determined.

Hence, it is seen how the invention may be utilized to test many different types of materials for internal imperfections.

Another form of the invention is shown in Figures 6, 7, and 8; and it operates as a permeability tester in the manner of the apparatus shown in Figure 1. The component items in Figure 6, which are similar to component items in Figure 1, have the same reference numeral but are prefixed by a "1"; for example, item 47 in Figure 1 has reference numeral 147 in Figure 6.

The apparatus in Figure 6 has first and second cylindrical members 110 and 111 of circular cross-section that are axially aligned and separated by a narrow gap 112 at their adjacent parallel ends 113 and 114.

Member 110 is divided into two equal pieces 116 and 117 by a plane transverse to the plane of gap 112; and the other member 111 is also divided into two equal pieces 118 and 119 along the transverse plane that divides first member 110.

A cylindrical support 121 of plastic material surrounds both cylindrical conducting members 110 and 111 and supports pieces 116, 117, 118, and 119 by screws 122, or by rivets, cement, or other suitable fastening means. Member 110 has at the intersection of the perpendicular planes four corners 126, 127, 128, and 129; and similarly the other member 111 has at the intersection four corners 131, 132, 133, and 134. Screws 122 are also provided which connect to each of the four corners. The corners of each of the cylindrical parts are perhaps best shown in Figures 8, 9, and 10. The corners shown in Figures 9 and 10 are viewed as they appear when looking from the left in Figure 7.

A conducting band 136 which may be made of copper is connected at one end to the screw 122 in corner 128, shown in Figure 9, and to the screw 122 in the diagonally opposite corner 126. Similarly, another conducting band 137 is connected at its ends by screws 122 to the other diagonally opposite corners 127 and 129 of the same member 110. An insulation strip 138 is placed between bands 136 and 137 to separate them at their cross-over place. In a like manner, the diagonally opposite corners 131 and 133 of the other cylindrical member 111 are connected by conducting band 141, shown in Figure 10; and another conducting band 142 similarly has its ends conductively fixed to the remaining diagonally opposite corners 132 and 134.

A yoke 143, which is an arcuate core of highly permeable material, such as ferrite, has its ends 144 and 146 received at diametrically opposite sides of plastic cylinder 121, and the ends 144 and 146 are centered with respect to gap 112, as is seen in Figure 7. A yoke bracket 147 which may be made of plastic material supports yoke 143 to plastic cylinder 121 in the above-described position. Yoke bracket 147 has a pair of notches 148 and 149 on opposite sides to enable it to be received over screw members 122.

A coil 151 is wound upon core 143 to provide an alternating magnetomotive force through the magnetic circuit of yoke 143 which includes gap 112 between yoke ends 144 and 146. A condenser 152 is connected in parallel with coil 151, and together they form a parallel resonant circuit 150 which may determine the frequency of an oscillator (not shown).

A paramagnetic cylindrical core 153, which is a workpiece to be tested, is received within cylindrical conducting members 110 and 111 in Figure 6.

The operation of the embodiment of Figure 6 is similar to the operation of the embodiment of Figure 1. However, the flux control action is somewhat different and the induced voltages in Figure 6 are made to aid each other in a series connection rather than with the parallel connection of Figure 1. In Figure 6, each member is divided into two pieces which are connected conductively at their diagonally opposite corners adjacent the gap 112, as is seen in Figures 9 and 10. This inventive set of connections takes the ordinarily opposing induced voltages and changes them into cooperating voltages which propagate current through the pieces and the adjoining strips along the paths shown in Figures 9 and 10 to provide a set of boundary conditions. Figure 9 shows schematically the series eddy current path in member 110, and the arrows 156 and 157 indicate the direction of the voltages induced at one instant. Similarly, Figure 10 shows schematically the eddy current path in member 111, and arrows 158 and 159 indicate the voltages induced in member 111 at the same instant.

Since the pieces and conducting strips have very low resistance, the current will be high and will provide a large flux which counteracts only the fringing flux that intersects the pieces, but the parallel flux within the gap 112 is not affected. Hence, the only flux which exists in the invention to any substantial extent is the flux within the narrow gap 112.

An advantage of the form of the invention in Figure 6 over the form in Figure 1 is that the former provides balanced conducting bands on opposite sides of each cylindrical member. The currents flowing through the bands set up flux fields which have a more uniform effect on the flux in the gap in the apparatus of Figure 6.

A third form of the invention is shown in Figures 11, 12, and 13 and, although operating in almost an identical manner with the forms of the invention shown in Figures 1 and 6, is used for an entirely different purpose. The apparatus in Figure 11 is a tuner which may be used in radio equipment. The items in Figure 11, which are similar to the items in Figures 1 and 6, have the same basic reference numeral but are prefixed with a "2"

rather than "1"; for example, Item 116 in Figure 6 has reference numeral 216 in Figure 11.

Structurally, the tuner has cylindrical conducting members 210 and 211 with square cross-sections for simplicity in this embodiment, but any type of cross-section might be used, as for example the circular cross-section shown for the embodiment in Figure 1. Cylindrical members 210 and 211 are separated by a narrow transverse gap 212 which is bordered by the adjacent parallel ends of the cylindrical members 210 and 211, respectively. As in the embodiment of Figure 1, each member is divided into two equal pieces along a plane transverse to gap 212. Member 210 is divided into equal pieces 216 and 217, and member 211 is divided into equal pieces 218 and 219.

A cylindrical support 221 of insulating material is received over cylindrical members 210 and 211 and supports pieces 216, 217, 218, and 219 by means of screws 222 or other fastening means. The four pieces have corners at the intersection of the perpendicular planes; and cylindrical member 210 has corners 226, 227, 228, and 229, while the other cylindrical member 211 has corners 231, 232, 233, and 234. The corners shown in Figures 14 and 15 are viewed as they appear when looking from the left in Figure 12.

A first conducting band 236 is conductively connected at its ends to diagonally opposite corners 226 and 228 by means of screws 222, and a second conducting band 237 connects at its ends to the remaining diagonally opposite corners 227 and 229 of member 210. An insulating 238 (see Figure 11) is located between bands 236 and 237 at their cross-over point ot insulate them from each other. Similarly, the other member 211 has its diagonally opposite corners connected by a third band 241 which is conductively connected at its ends by means of screws 222 to diagonally opposite corners 231 and 233, and by a fourth band 242 which is connected at its ends by means of other screws 122 to the remaining diagonally opposite corners 232 and 234. Bands 241 and 242 are also insulated at their cross-over point by a second insulating strip (not shown).

A yoke 243 is supported at its ends 244 and 246 to the surface of cylindrical support 221 by means of respective yoke brackets 247a and 247b. The yoke ends are centered with respect to gap 212 and are centrally located with respect to the corners. A core 253 of highly permeable material is formed triangularly along its length, as is seen in Figure 12, but is formed rectangularly along its cross-section, as is seen in Figure 13. Core 253 has connected at its outer end a short portion 261 of a J-shaped actuating member 260 which has its lower portion 262 passed through a pair of T-shaped openings 263 and 264 in a U-shaped frame member 266 that is fixed at its ends 267 and 268 to cylindrical support 221. Lower portion 262 of actuating member 260 has a generally T-shaped cross-section with a gear rack 269 formed on its bottom. A support 271 is fixed to bracket 266 and rotatably supports a shaft 272 that has a knob 273 fixed at its outer end and a gear 274 fixed at its inner end to mesh with the teeth of rack 269.

A coil 251 is wound about yoke 243 and a capacitor 252 is connected in parallel with coil 251 to form a tank circuit 250 which is tuned by longitudinal movement of core 253.

The operation of the embodiment of Figure 11 is substantially similar to the operation of Figure 1. Since the permeability of yoke 243 and core 253 is very high, as for example 1000, substantially all of the reluctance provided to the magnetic path of coil 251 is due to the non-permeable space between yoke ends 244 and 246. A portion of gap 212 is filled with the permeable cross-section 276 shown by dotted lines in Figure 12. Hence, the non-permeable air space within gap 212 will change linearly with longitudinal core movement through gap 212 and mathematically may be stated substantially accurately as:

$$R = C(D - H)$$

Where R is the reluctance of the magnetic circuit of coil 251, D is the distance between yoke ends 244 and 246, and H is the average height of the cross-section 276 presented within gap 212. Consequently, the reluctance provided the magnetic path of coil 251 changes linearly as core 253 is moved through gap 212 and furthermore changes linearly with rotation of knob 273 which rotates linearly with core movement. The inductance of coil 251 and hence the frequency of tank circuit 250 comprised of coil 251 and condenser 252 is controlled essentially by the reluctance provided between yoke ends 244 and 246.

It is apparent that any relationship including a linear one may be obtained between knob rotation and the resonant frequency in tank circuit 250 since the relationship is substantially a function of the variation of the cross-sectional shape of core 253 which may be easily determined when gap 212 is narrow.

It is therefore apparent that this invention provides a means for concentrating all of the alternating flux of a magnetic circuit within narrow boundaries that are easily accessible and that fringing flux cannot exist substantially outside of those boundaries. The resultant flux field consists of only substantially parallel lines of flux which may be confined within close boundaries. It is further seen that this invention provides among other things a precise means for testing material and further provides a tuning means.

It is apparent that the invention may be used in many other embodiments than those shown and described and that the scope of the invention is not intended to be limited thereby. Therefore, there may be suggested to those skilled in the art many modifications which do not necessarily depart from the spirit or scope of the invention as defined by the appended claims.

We claim:

1. Means for preventing alternating flux from substantially exceeding a boundary that is parallel to the direction of said flux comprising, a hollow member having an open end supported at the flux boundary and the remaining portion of said member supported on the fluxless side of said boundary, said hollow member formed of two conducting pieces that are separated along a plane generally transverse to the direction of said flux, the hollow member having at one end four adjacent corners located at the intersection of plane of separation and the flux boundary, a first conductor connecting one pair of diagonally opposite corners, and a second conductor connecting the other pair of diagonally opposite corners, whereby a circuit is provided by the conductors for alternating eddy currents that provide the flux boundary.

2. Flux control means comprising, means for generating an alternating flux across an opening, two hollow conducting members supported at said opening with their axes intersecting the direction of said flux, said conducting members separated insulatingly by a gap that is situated in said opening in a plane substantially parallel to the direction of said flux, each of said members divided insulatingly into two pieces along planes that intersect the direction of said flux, the two pieces of the first member having four adjacent corners located at the intersection of the gap and the separation planes, a first conductor connecting one pair of diagonally opposite corners of said first member, a second conductor connecting the other pair of diagonally opposite corners of said first member, the two pieces of the second member also having four adjacent corners located at the intersection of the gap and the transverse separation, a third conductor connecting one pair of diagonally opposite corners of said second member, and a fourth conductor connecting the other pair of diagonally opposite corners of said second member.

3. Means for confining alternating flux within boundaries comprising, a yoke of permeable material formed with an opening, a pair of axially aligned hollow members supported with their adjacent ends within said opening, said adjacent ends separated by a gap for receiving the bounded flux, each of said members divided into two separate pieces of conducting material by a separation that is in a plane generally transverse to the flux, each of said members having four corners adjacent the gap and transverse plane, four bands of conducting material, and a different of said bands connecting a different pair of diagonally opposite corners of each of said members, whereby eddy current paths are provided by the bands on either side of said flux sheet to prevent flux from fringing outside of the boundaries.

4. Means for testing variations in the permeability of a paramagnetic core by variation in the inductance of an indicating coil comprising, a yoke of permeable material which is the core for said coil, said yoke formed with an opening that is in series with its magnetic circuit, a pair of axially aligned cylindrical members supported with their adjacent ends within the opening of said yoke, said cylindrical members separated by a gap generally parallel to the flux field of said yoke, each of said cylindrical members divided throughout its length by a separation that is in a plane generally perpendicular to the plane of said gap to divide each of the members into two insulated pieces, each member having four adjacent corners at the intersection of the two perpendicular planes, two conductors positioned externally to said first member and separately connecting the diagonally opposite corners of said first member, two other conductors positioned externally to said second member and separately connecting the diagonally opposite corners of said second member, whereby the inductance of said coil is varied by any variation in permeability of an incremental cross-section of the paramagnetic core moved through said gap.

5. A flux controlled variable inductance coil comprising, a yoke of permeable material providing the core for said coil, said yoke formed with an opening that is in series with its magnetic circuit, a pair of axially aligned cylindrical members supported with their adjacent ends within the opening of said yoke, said cylindrical members separated by a gap generally parallel to the flux field of said yoke, each of said cylindrical members divided throughout its length by a separation that is in a plane generally perpendicular to the plane of said gap to divide each of the two members into two insulated pieces, each member having four adjacent corners at the intersection of the perpendicular planes, two conductors positioned externally to said first member and separately connecting the diagonally opposite corners of said member, two other conductors positioned externally to said second member and separately connecting the diagonally opposite corners of said second member, a core of permeable material supported within and movable longitudinally of said conducting cylinder, said core formed with a variable cross-section to vary the inductance of said coil, whereby the inductance of said coil is a direct function of the variation in cross-section of said core as it is moved longitudinally through said gap.

6. Flux control means comprising, an arcuate yoke of permeable material having an opening between its ends, a coil wound about said core to provide an alternating magnetic circuit through the yoke and opening, a tube of insulating material supported in the opening with its axis transverse to a hypothetical line centrally connecting the yoke ends, said yoke ends received at diametrically opposite sides of said tube, four semi-cylindrical pieces of conducting material fastened insulatingly from each other to the internal surface of said tube, said four pieces aligned cylindrically but separated along two transverse planes, the first of said planes including the line centrally connecting the yoke ends, the second of said planes generally perpendicular to the first plane, the pieces spaced apart along the first plane by an amount that is narrow compared to the longitudinal width of said yoke ends, said pieces having eight corners at the intersection of said planes, four bands of conducting material located external to said insulating tube, two of said bands separately connecting the diagonally opposite corners on one side of said first plane, the other two of said bands separately connecting the diagonally opposite corners on the other side of said first plane, whereby complete inductive current paths are provided on each side of said first plane.

7. Tuning means comprising, an arcuate yoke of permeable material having an opening between its ends, a coil wound about said core to provide an alternating magnetic circuit through the yoke and opening, a rectangular tube of insulating material supported in the opening with its axis transverse to a hypothetical line centrally connecting the yoke ends, said yoke ends received on diametrically opposite sides of said rectangular tube, four pieces of conducting material fastened to the internal surface of said rectangular tube and aligned to form a rectangular cylinder, said pieces separated insulatingly by two transverse planes, the first of said planes including the line centrally connecting the yoke ends, the pieces spaced apart along the first plane by an amount that is narrow compared to the longitudinal width of said yoke ends, said pieces having eight corners at the intersection of said planes, four bands of conducting material located externally to said insulating tube, two of said bands separately connecting the diagonally opposite corners on one side of said first plane, the other two of said separately connecting the diagonally opposite corners on the side of said first plane, a core of permeable material slideably received within said rectangular tube, said core formed with a triangular longitudinal cross-section and a rectangular transverse cross-section, shaft means coupled to said core to move it when said shaft is rotated, and a resonant circuit including said coil, whereby the tuned freqency of said resonant circuit obtained by rotation of said shaft is a function of the longitudinal cross-section of said core.

8. Means for preventing flux from substantially exceeding a boundary that is parallel to the direction of said flux comprising, a hollow member having an open end supported at the flux boundary, the remaining portion of said member supported on the fluxless side of said boundary, conducting means connected adjacent the boundary end of said member between points on said member that are substantially diametrically opposite each other, and said points located adjacent to a plane that is generally transverse to the direction of the flux.

9. An apparatus as in claim 8 wherein said hollow member is separated into two pieces along the transverse plane, and said conducting means comprising two conducting bands separately connecting diagonally opposite points adjacent the transverse plane.

10. Flux control means comprising, means for generating an alternating flux across an opening, two hollow conducting members supported with their ends in said flux and their axes intersecting the direction of said flux, said conducting members separated insulatingly by a gap that is situated in said opening in a plane substantially parallel to the direction of said flux, a first conductor connected to one of said members adjacent the flux gap, said first conductor connected between opposite points of said first member located adjacent to a plane transverse to said flux, a second conductor connected to the other of said members adjacent the flux gap, and said second conductor connected between opposite points of said second member located adjacent to a plane transverse to said flux, whereby a flux field is maintained substantially within said gap.

11. Means for confining alternating flux within boundaries comprising, four pieces of conducting material separated insulatingly from each other along two transverse intersecting hypothetical planes, each of said four pieces located in a different solid angle subtended by said planes, said alternating flux having at least a component that passes along the first of said planes in a direction generally transverse to the other of said planes, a first band of conducting material connecting one pair of diagonally opposite ends of said pieces lying on one side of said first plane, a second band of conducting material connecting the remaining pair of diagonally opposite ends of said pieces lying on the same side of said first plane as said first band, a third band of conducting material connecting one pair of diagonally opposite ends of said pieces lying on the other side of said first plane, and a fourth band of conducting material connecting the remaining diagonally opposite ends of the pieces lying on the same side of said first plane as the third band.

References Cited in the file of this patent

UNITED STATES PATENTS

| | | |
|---|---|---|
| 534,731 | Thomson | Feb. 26, 1895 |
| 2,714,710 | Bradley | Aug. 2, 1955 |